United States Patent
Liang et al.

(10) Patent No.: US 11,494,200 B2
(45) Date of Patent: Nov. 8, 2022

(54) CONFIGURING AN ELECTRONIC DEVICE USING ARTIFICIAL INTELLIGENCE

(71) Applicant: Microsoft Technology Licensing, LLC, Redmond, WA (US)

(72) Inventors: Chen Liang, Redmond, WA (US); Bryston M. Nitta, Redmond, WA (US); Shayak Lahiri, Redmond, WA (US); Adrian Francisco Teran Guajardo, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 702 days.

(21) Appl. No.: 15/994,442

(22) Filed: May 31, 2018

(65) Prior Publication Data
US 2019/0339989 A1 Nov. 7, 2019

Related U.S. Application Data

(60) Provisional application No. 62/666,084, filed on May 2, 2018.

(51) Int. Cl.
| | |
|---|---|
| *G06F 9/445* | (2018.01) |
| *G06F 9/54* | (2006.01) |
| *G06N 20/00* | (2019.01) |
| *G06F 16/907* | (2019.01) |
| *G06N 3/10* | (2006.01) |
| *H04W 4/02* | (2018.01) |
| *G06Q 10/06* | (2012.01) |

(52) U.S. Cl.
CPC ............ *G06F 9/4451* (2013.01); *G06F 9/542* (2013.01); *G06F 16/907* (2019.01); *G06N 3/10* (2013.01);
(Continued)

(58) Field of Classification Search
CPC ... H04L 41/5019; G06F 9/4451; G06F 9/542; G06F 8/60; G06F 8/70; G06F 16/907;
(Continued)

(56) References Cited

U.S. PATENT DOCUMENTS 8,655,307 B1 * 2/2014 Walker ................ H04W 68/005
455/405
8,983,849 B2 * 3/2015 Phillips .................. G10L 15/22
704/276

(Continued)

FOREIGN PATENT DOCUMENTS

WO 2017024161 A1 2/2017
WO 2017213857 A1 12/2017

OTHER PUBLICATIONS

"International Search Report and Written Opinion Issued in PCT Application No. PCT/US2019/028265", dated Jul. 19, 2019, 14 Pages.

(Continued)

*Primary Examiner* — Andrew L Tank (57) ABSTRACT

The devices, systems, and methods described herein enable automatically configuring an electronic device using artificial intelligence (AI). The devices, systems, and methods enable accessing telemetry data representing device usage data, inputting the accessed telemetry data into machine learning models that are matched to device metadata, and determining notifications to publish to components of the electronic device. The notifications represent events predicted to occur on the electronic device. The notifications are published to the components of the electronic device such that the electronic device is configured according to the published notifications. The determined notifications enable the identification of optimal settings for the electronic device based on the usage pattern of the device and enable components of the electronic device to preemptively take action on events which are predicted to occur in the future.

20 Claims, 5 Drawing Sheets

(52) U.S. Cl.
CPC ......... *G06N 20/00* (2019.01); *G06Q 10/0631* (2013.01); *H04W 4/02* (2013.01)

(58) Field of Classification Search
CPC . G06F 3/01; G06N 20/00; G06N 3/10; G06Q 10/0631; G08B 31/00; H04W 4/02
See application file for complete search history.

(56) References Cited

U.S. PATENT DOCUMENTS

| | | | |
|---|---|---|---|
| 9,063,818 B1* | 6/2015 | Risbood | G06F 8/61 |
| 9,378,467 B1 | 6/2016 | Chaiyochlarb et al. | |
| 10,733,531 B2* | 8/2020 | Hammond | G06F 3/0482 |
| 2010/0112955 A1* | 5/2010 | Krishnaswamy | H04L 67/325 |
| | | | 455/67.11 |
| 2016/0379105 A1 | 12/2016 | Moore et al. | |
| 2017/0140285 A1 | 5/2017 | Dotan-cohen et al. | |
| 2017/0357910 A1* | 12/2017 | Sommer | G06F 9/54 |
| 2019/0065970 A1* | 2/2019 | Bonutti | G06N 20/00 |
| 2019/0238443 A1* | 8/2019 | Di Pietro | H04L 41/5019 |

OTHER PUBLICATIONS

Pulavarthi, Prasanth, "Announcing ONNX 1.0—An open ecosystem for AI," Microsoft 365 blog, Dec. 6, 2017, 4 pages.
ONNX Tutorial, "Visualizing an ONNX Model," Nov. 17, 2017, 4 pages.
"Office Action Issued in Indian Patent Application No. 202047047565", dated Aug. 11, 2022, 8 Pages.

\* cited by examiner

CONFIGURING AN ELECTRONIC DEVICE USING ARTIFICIAL INTELLIGENCE

CROSS-REFERENCE TO RELATED APPLICATION

The present application claims priority to U.S. provisional patent application Ser. No. 62/666,084, filed May 2, 2018, entitled "Configuring an Electronic Device Using Artificial Intelligence", and hereby incorporated by reference herein in its entirety.

BACKGROUND

Electronic devices, such as personal computers, workstations, laptops, mobile phones, tablet computers, and the like include operating systems composed of a variety of components configured to support a broad range of customer scenarios, functionality, and personalized preferences. The operational settings of an operating system are often configured by an administrator or manufacturer with generalized default settings that provide a "one size fits all" experience for the user. But, such generalized default settings may provide a subpar experience for that user or may compromise the operational performance of the device, for example because of the unique pattern of use of the device by the user or the personal preferences of the user. Moreover, personalizing the device for the user is performed via manual configuration of the various settings, which may be tedious and time-consuming.

Electronic devices also include a variety of components, such as application software, internal hardware, and external hardware (e.g., peripherals and the like) that may be initially configured with generalized default software that supports a wide variety of functions of the component. But, some functions of the component may not be utilized by the user and thus the component may include unnecessary software that may stress the limited memory and/or processing power of the particular component. Moreover, while components of electronic devices may react to real-time notifications from the operating system of various events (e.g., the device shutting down, peripherals being unplugged, loss of power, application software being activated, and the like), such real-time reactions may slow operation of the device. For example, it may take longer to power-down hardware associated with an unplugged peripheral, or it may take longer to load a requested application, other components subscribed to the application, or hardware associated with the requested application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method comprises receiving, at an electronic device, machine learning models matched to device metadata from a cloud service, accessing telemetry data representing device usage data, inputting the accessed telemetry data into the received machine learning models to determine notifications to publish to components of the electronic device, publishing the determined notifications to the components, the notifications representing events predicted to occur on the electronic device, and configuring, by the components, the electronic device based on the published notifications.

BRIEF DESCRIPTION OF THE DRAWINGS

The present description will be better understood from the following detailed description read in light of the accompanying drawings, wherein.

Corresponding reference characters indicate corresponding parts throughout the drawings.

DETAILED DESCRIPTION

Referring to the figures, the devices, systems, and methods described herein enable automatically configuring an electronic device using artificial intelligence (AI). The devices, systems, and methods enable accessing telemetry data representing device usage data, inputting the accessed telemetry data into machine learning models that are matched to device metadata, and determining notifications to publish to components of the electronic device. The notifications represent events predicted to occur on the electronic device. The notifications are published to the components of the electronic device such that the electronic device is configured according to the published notifications. The determined notifications enable the identification of optimal settings for the electronic device based on the usage pattern of the device and enable components of the electronic device to preemptively take action on events which are predicted to occur in the near future.

The devices, systems, and methods described herein enable components of the electronic device to utilize personalization, configuration, and predictive notifications to automatically configure the electronic device. The determined notifications increase the intelligence of an operating system of the electronic device, and improve the resilience and overall functioning of the electronic device. The determined notifications enable automatic remediation of the electronic device and may result in less expensive hardware (e.g., Internet of Things (IoT) devices) tailored for user-specific use.

Further, the electronic device, when configured to perform the operations described herein, operates in an unconventional manner to increase the speed of the electronic device, conserve memory, reduce processor load, improve operating system resource allocation, improve user efficiency, increase user interaction performance, reduce error rate, and/or the like.

Figure 1:
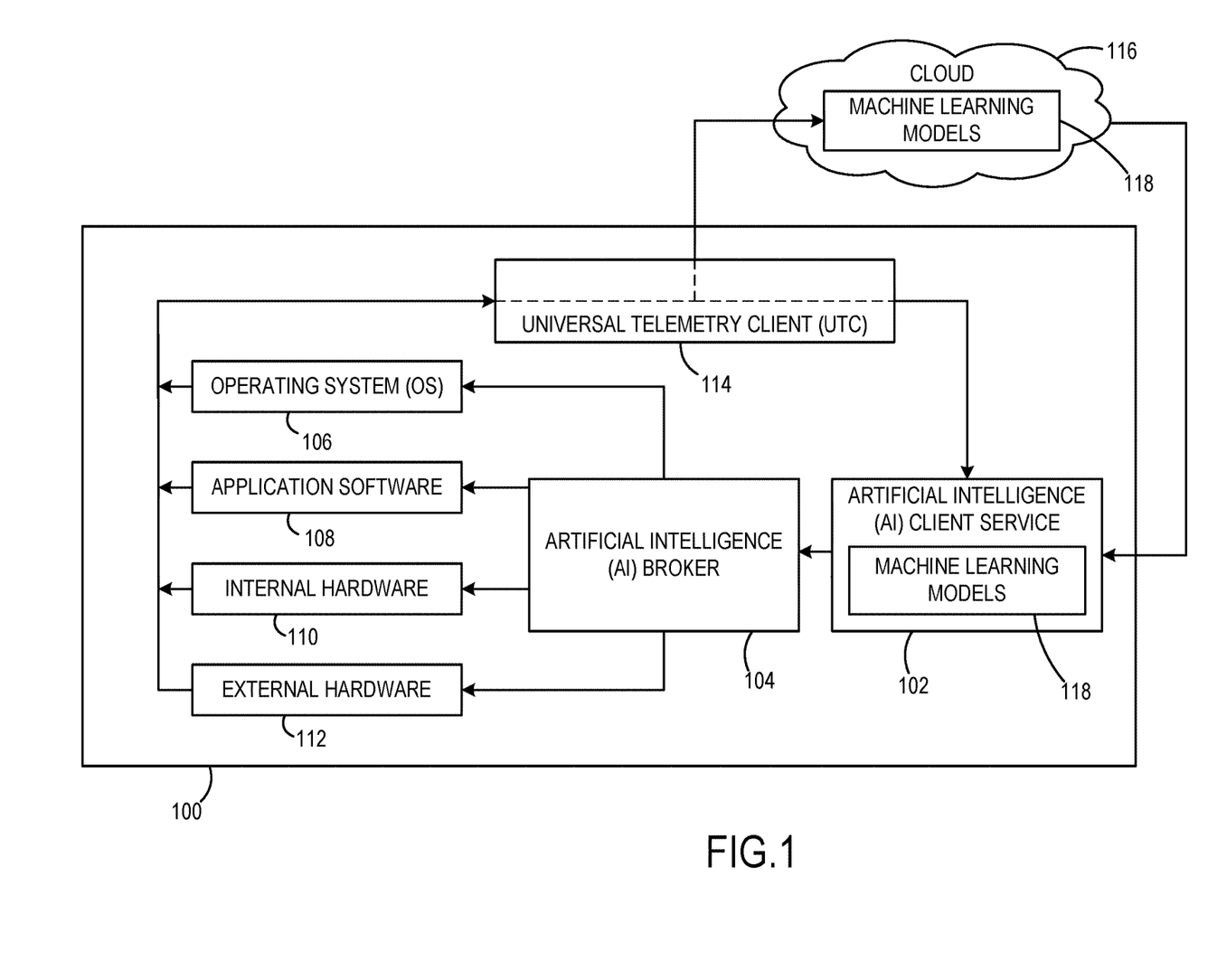
FIG. 1 is an exemplary block diagram illustrating an electronic device including an artificial intelligence (AI) client service and an AI broker according to an embodiment.

Referring to FIG. 1, an exemplary block diagram illustrates an electronic device 100 including an artificial intelligence (AI) client service 102 and an AI broker 104 according to an embodiment. As will be described in more detail below, the AI client service 102 inputs telemetry data that represents at least device usage data into machine learning models 118 to determine notifications that are published by the AI broker 104 to various components 106, 108, 110, and/or 112 of the electronic device 100 for automatically configuring the electronic device 100.

The electronic device 100 represents any device executing instructions (e.g., as application programs/software, operating system functionality, or both) to implement the operations and functionality associated with the electronic device. The electronic device may include a mobile electronic device or any other portable device. In some examples, the mobile electronic device includes a mobile telephone, laptop, tablet, computing pad, netbook, gaming device, personal digital assistant, and/or portable media player. The electronic device may also include less portable devices such as desktop personal computers, servers, kiosks, tabletop devices, media players, industrial control devices, gaming consoles, wireless charging stations, and electric automobile charging stations. Additionally, the electronic device may represent a group of processing units or other computing devices. As used herein, 'components' of the electronic device 100 may include, but are not limited to, an operating system of the electronic device 100, application software (also referred to herein as "applications") that runs on the electronic device 100, internal hardware of the electronic device 100, and/or external hardware (e.g., peripherals and/or the like) communicatively coupled to the electronic device 100.

The electronic device 100 includes platform software comprising an operating system (OS) 106 or any other suitable platform software to enable application software 108 to be executed on the electronic device. The electronic device 100 includes internal hardware 110, such as, but not limited to, video (graphic) cards, sound cards, network cards, television tuners, radio tuners, processors, motherboards, memories, hard drives, media drives, batteries, power supplies, and/or the like. The electronic device 100 also includes external hardware 112, such as, but not limited to, input devices (e.g., keyboards, trackpads, a mouse, microphones, cameras, drawing tablets, headsets, scanners, and/or the like), output devices (e.g., monitors, televisions, printers, speakers, fax machines, and/or the like), external hard drives, wireless routers, surge protectors, IoT devices, other peripherals, and/or the like.

The electronic device 100 includes a universal telemetry client (UTC) 114 that gathers telemetry data from the electronic device 100 for use by the AI client service 104. The UTC 114 is communicatively coupled to the various components of the electronic device 100 to receive the telemetry data from the various components, such as, but not limited to, the OS 106, the application software 108, the internal hardware 110, the external hardware 112, and/or the like. The telemetry data gathered by the UTC 114 represents device usage data. Specifically, the telemetry data gathered by the UTC 114 includes data that represents how the electronic device 100 has been used by the user (e.g., the usage pattern over time) and may, in some examples, include real-time data that represents how the electronic device 100 is currently being used by the user. The telemetry data gathered by the UTC 114 is used to indicate how the user intends to use the electronic device 100 in the future. For example, the telemetry data gathered by the UTC 114 may enable the AI client service 102 to predict events that may occur on the electronic device 100, as described herein.

Examples of telemetry data gathered by the UTC 114 include, but are not limited to, data from the OS 106 representing the personal settings of the user on the electronic device 100 (e.g., how the user has personalized the electronic device 100), data from the OS 106 representing how particular use of the electronic device 100 affects the performance (e.g., battery life, processing load, processing time, loading time, faults, and/or the like) of the electronic device 100 and/or one or more components thereof, data representing a fault of the electronic device 100 and/or a component thereof, data representing a bad deployment of application software and/or hardware, data representing preferences of the user, data representing expectations of the user, data representing thresholds defined and/or expected by the user, data representing when and/or how the user has used the various application software 108, data representing intended use of application software 108, data representing when and/or how the user has used the various internal hardware 110, data representing intended use of internal hardware 110, data representing when and/or how the user has used the various external hardware 112, data representing intended use of external hardware 112, data representing the closing and/or de-activation of application software 108, data representing the powering-down of internal hardware 110, data representing powering-down and/or disconnection of external hardware 112, data representing the powering-down of the electronic device 100, custom hardware of the electronic device 100, proprietary chips, additional hardware and/or software of the electronic device 100 (e.g., a military device, a government device, a developer device, etc.), whether the electronic device 100 is a work device or a personal device, and/or the like.

The UTC 114 is communicatively coupled to the AI client service 102. As will be described in more detail below, the UTC 114 transmits or otherwise provides the telemetry data to the AI client service 102, which inputs the telemetry data into the machine learning models 118 to determine notifications that are published by the AI broker 104 to various components 106, 108, 110, and/or 112 of the electronic device 100. The UTC 114 is also communicatively coupled to a cloud service 116 for uploading the telemetry data to the cloud service 116 to enable the cloud service to create and/or update the machine learning models 118 based on the telemetry data.

The machine learning models 118 are generated in the cloud service 116, in one example, and are grouped by device metadata. Device metadata includes any data describing the electronic device 100, such as device name, ownership, user name, hardware configuration and capability, device usage patterns, device execution behavior, location, and the like. In some examples, the machine learning models 118 include custom machine learning models 118 from the electronic device 100 and/or a private cloud service (not shown) that is associated with the electronic device 100 and/or the user of the electronic device 100. For example, machine learning models 118 generated in the cloud service 116 may be augmented (e.g., updated) using information that is unknown to the cloud service 116 but is known by the electronic device 100 and/or the user. In some examples, the information unknown by the cloud service 116 that is used by the electronic device 100 to augment the machine learning models 118 is not transmitted to the cloud service 116 by the UTC 114 (e.g., is not crowdsourced). In this way, the electronic device 100 can update at least some of the machine learning models 118 without sharing proprietary and/or custom information with the cloud service 116. Examples of the information unknown by the cloud service 116 that is used by the electronic device 100 to augment the machine learning models 118 include, but are not limited to, custom hardware of the electronic device 100, proprietary chips, additional hardware and/or software of the electronic device 100 (e.g., a military device, a government device, a developer device, etc.), whether the electronic device 100 is a work device or a personal device, and/or the like.

The machine learning models 118 may be any type of machine learning model, such as, but not limited to, Open Neural Network Exchange (ONNX) models and/or the like. The UTC 114 uploads the telemetry data from the electronic device 100 to the cloud service 116 to create and/or update the machine learning models 118 at the cloud service 116. For example, the cloud service 116 collects the telemetry data from the electronic device 100 and the collected telemetry data is used to train the machine learning models 118. In addition, the cloud service 116 may collect telemetry data from other electronic devices (not shown) to further update the machine learning models 118. Many electronic devices may provide the cloud service 116 with telemetry data such that future machine learning models 118 may be improved through crowdsourcing in this manner.

The AI client service 102 is communicatively coupled to the cloud service 116 to receive the machine learning models 118 from the cloud service 116. For example, the AI client service 102 may request the machine learning models 118 from the cloud service 116 based on metadata of the electronic device 100, and receive the machine learning models 118 that have been created for devices such as electronic device 100. In this manner, the electronic device 100 receives specific machine learning models 118 that may be more suitable for the electronic device 100 than other machine learning models 118.

The AI client service 102 receives the machine learning models 118 from the cloud service 116 and stores the machine learning models 118 using a memory of the electronic device 100. The AI client service 102 is also communicatively coupled to the UTC 114 for receiving the telemetry data from the UTC 114. The AI client service 102 inputs the telemetry data received from the UTC 114 into the machine learning models 118, received from the cloud service 116, to determine notifications to publish to the components 106, 108, 110, and 112 of the electronic device 100. The notifications represent events predicted to occur on the electronic device 100 based on the telemetry data input into the machine learning models 118.

In some examples, the AI client service 102 comprises a trained regressor such as, but not limited to, a random decision forest, directed acyclic graph, support vector machine, neural network, other trained regressor, and/or the like. The trained regressor may be trained using the telemetry data from the electronic device 100 and/or telemetry data from other electronic devices. Examples of trained regressors include a convolutional neural network and a random decision forest. It should further be understood that the AI client service 102, in some examples, may operate according to machine learning principles and/or techniques known in the art without departing from the systems and/or methods described herein.

The AI client service 102 comprises software stored in memory and executed on a processor in some cases. In some examples, the AI client service 102 is executed on an Field-programmable Gate Array (FPGA) or a dedicated chip. For example, the functionality of the AI client service 102 may be implemented, in whole or in part, by one or more hardware logic components. For example, and without limitation, illustrative types of hardware logic components that can be used include FPGAs, Application-specific Integrated Circuits (ASICs), Application-specific Standard Products (ASSPs), System-on-a-chip systems (SOCs), Complex Programmable Logic Devices (CPLDs), Graphics Processing Units (GPUs), and/or the like.

The AI client service 102 and/or the cloud service 116 may make use of training data pairs when applying machine learning techniques and/or algorithms. Millions of training data pairs (or more) may be stored in a machine learning data structure (e.g., the machine learning models 118). In some examples, a training data pair includes an input or feedback data value paired with a criteria update value. The pairing of the two values demonstrates a relationship between the input or feedback data value and the criteria update value that may be used by the machine learning models 118 to determine future criteria updates according to machine learning techniques and/or algorithms.

Figure 2:
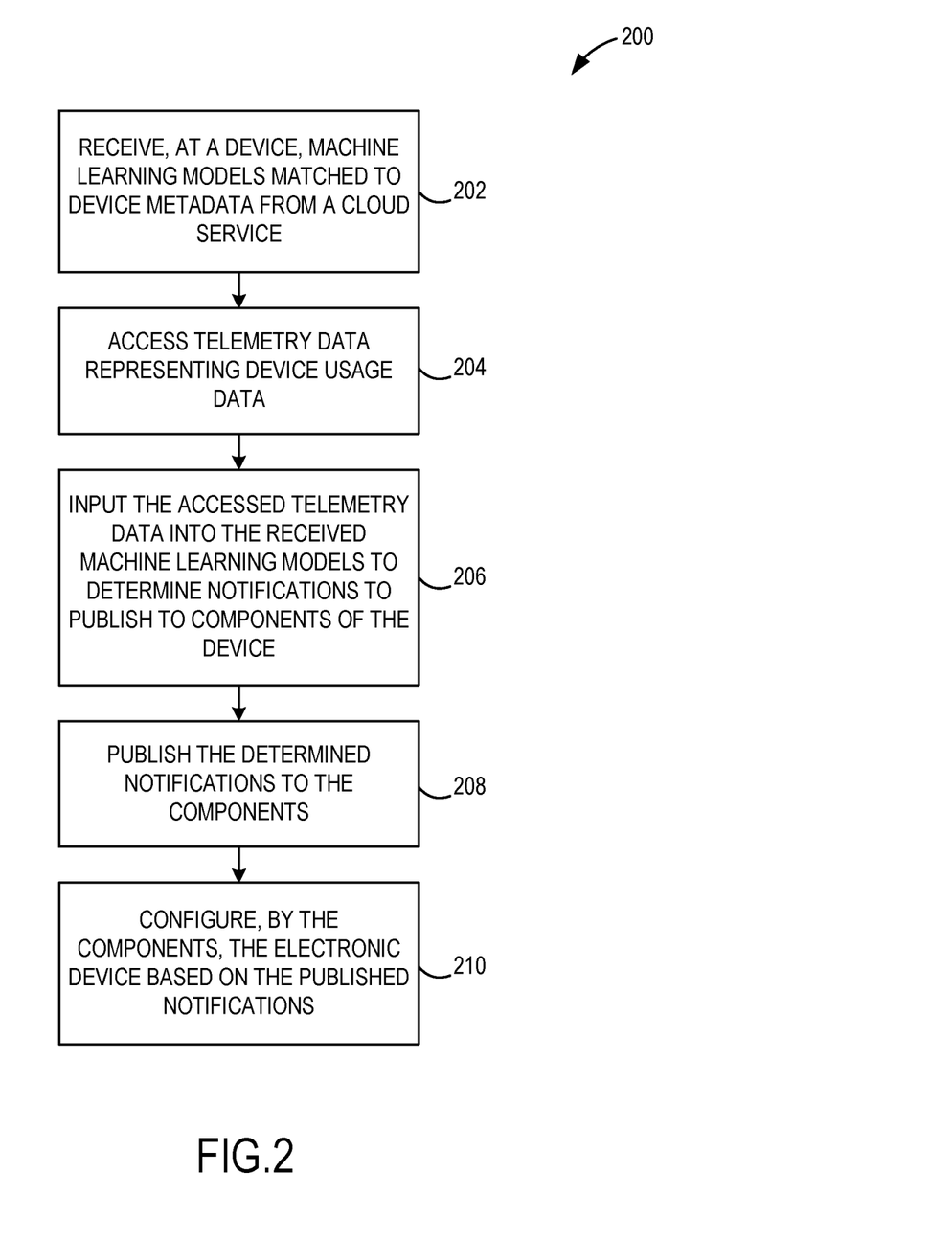
FIG. 2 is an exemplary flow chart illustrating a method of configuring an electronic device using artificial intelligence (AI) according to an embodiment.
Figure 3:
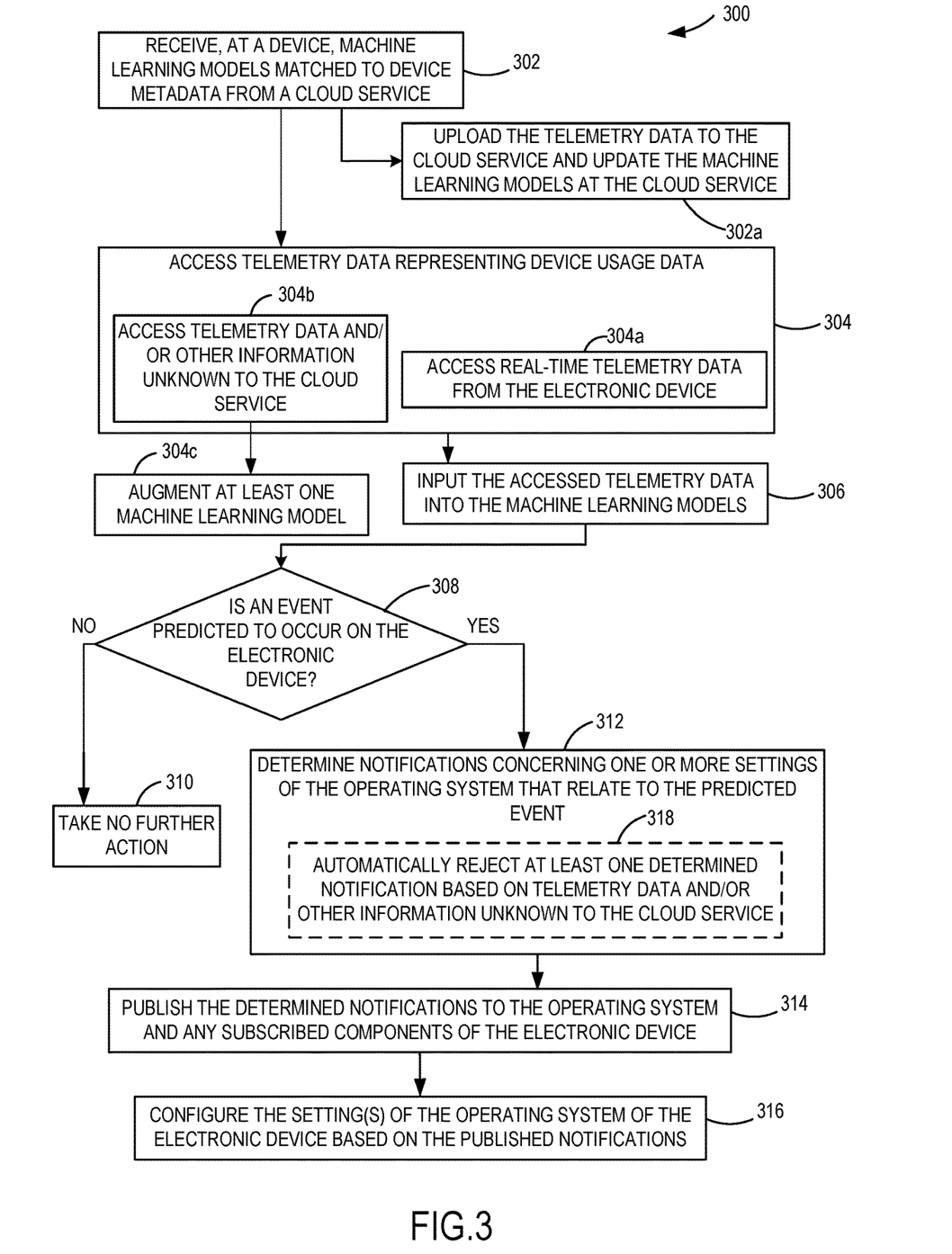
FIG. 3 is an exemplary flow chart illustrating a method of configuring one or more settings of an operating system (OS) of an electronic device using AI according to an embodiment.
Figure 4:
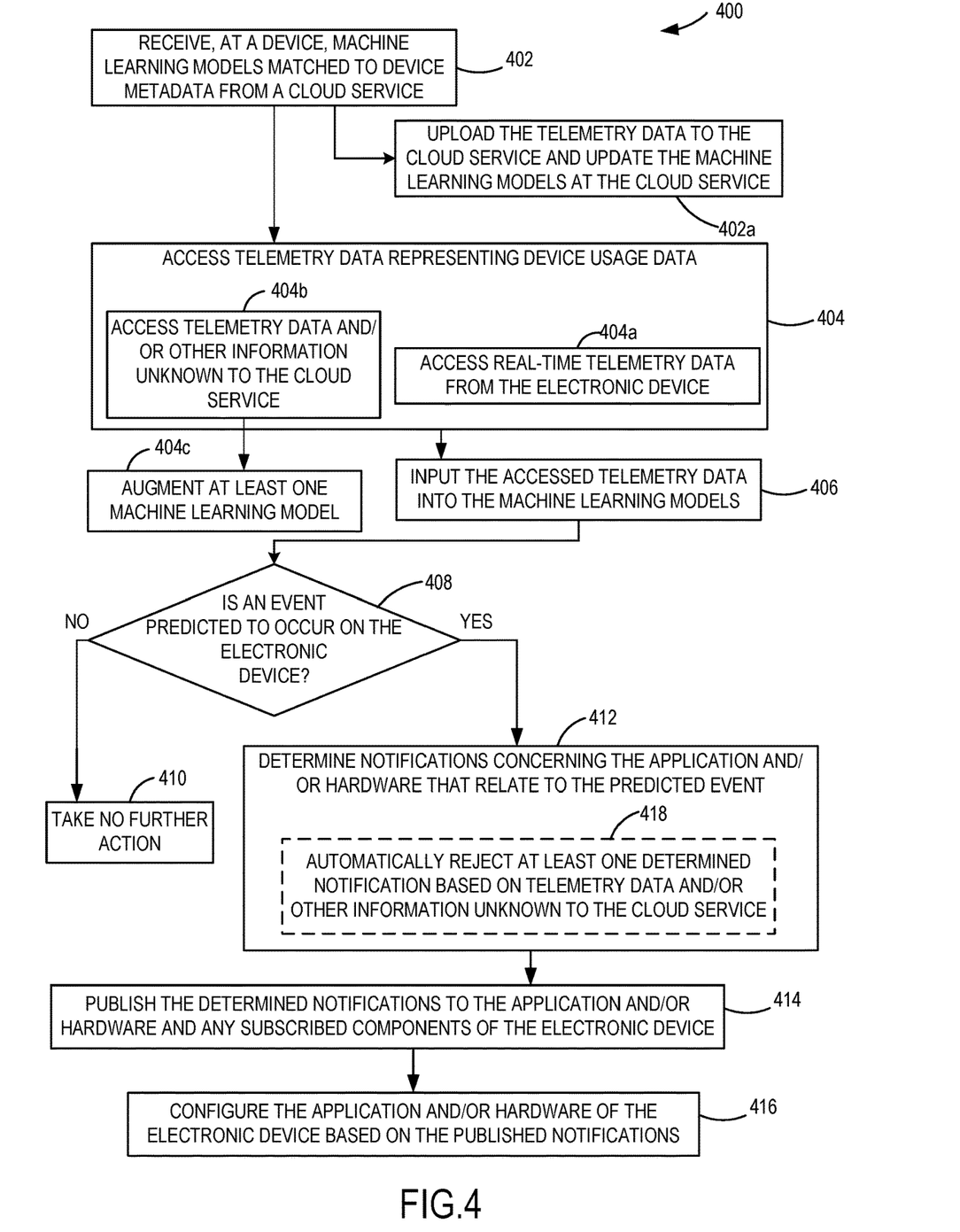
FIG. 4 is an exemplary flow chart illustrating a method of configuring an application and/or hardware of an electronic device using AI according to an embodiment.

The AI client service 102 is arranged to execute the methods described herein with respect to FIGS. 2-4 to determine notifications that are published by the AI broker 104 to various components 106, 108, 110, and/or 112 of the electronic device 100 for automatically configuring the electronic device 100, or taking other action on the electronic device 100. In some examples, notifications determined by the AI client service 102 may include a prompt to the user informing the user of the automatic configuration, along with a selection to confirm or reject the automatic configuration.

As described above, the notifications determined by the AI client service 102 represent events predicted to occur on the electronic device 100 based on the telemetry data input into the machine learning models 118. Events that are predicted to occur by the AI client service 102 include, but are not limited to, the contradiction of a preference and/or action of the user with an expectation of the user, the contradiction of a preference and/or action of the user with a threshold defined and/or expected by the user, a bad deployment of application software and/or hardware, a fault of the electronic device 100 and/or a component thereof, the upcoming use and/or activation of application software 108, an intended use of application software 108, the upcoming use and/or activation of internal hardware 110, an intended use of internal hardware 110, the upcoming use and/or activation of external hardware 112, an intended use of external hardware 112, the upcoming closing and/or de-activation of application software 108, the upcoming powering-down of internal hardware 110, the upcoming powering-down and/or disconnection of external hardware 112, and/or other predictions.

In some examples, notifications determined by the AI client service 102 concern, or otherwise relate to, one or more settings of the OS 106 such that the notification indicates, to the OS 102, to configure the setting(s) according to the notification. The notification concerning the setting(s) of the OS 106 may also instruct other subscribed components of the OS 106 and/or other subscribed components 108, 110, and 112 of the electronic device 100 to be configured according to the notifications, or according to the configuration of the setting(s) of the OS 106 in response to the notifications.

Notifications determined by the AI client service 102, in some examples, may concern particular application software 108 such that the particular application software 108 self-configures according to the notification. The notification concerning the application software 108 may also instruct one or more subscribed components of the OS 106 and/or other subscribed components 108, 110, and/or 112 of the electronic device 100 to be configured according to the configuration of the application software 108. Alternatively, the components of the OS 106 and/or other subscribed components 108, 110, and/or 112 of the electronic device 100 may choose, at their discretion, to act on the notification (e.g., self-configure).

In some examples, notifications determined by the AI client service 102 may concern particular internal hardware 110 such that the notification indicates, communicates, or represents to the particular internal hardware 110 (and subscribed components of the OS 106 and/or other subscribed components 108, 110, and/or 112), desirable configuration corresponding to, or based on, the notification. Moreover, notifications determined by the AI client service 102, in some examples, may concern particular external hardware 112 such that the notification instructs the particular external hardware 112 (and subscribed components of the OS 106 and/or other subscribed components 108, 110, and/or 112) to configure according to the notification.

As described above, in some examples, the machine learning models 118 include custom machine learning models 118. For example, the AI client service 102 may receive from the UTC 114 telemetry data and/or other information associated with the user and/or the electronic device 100 that is unknown to the cloud service 116. The AI client service 102 may then augment one or more of the machine learning models 118 using the received telemetry data and/or other information that is unknown to the cloud service 116 to generate one or more custom machine learning models 118 that are customized to the user and/or the electronic device 100. The AI client service 102 can thereby determine notifications that are customized to the user and/or the electronic device 100. As described above, the UTC 114 may not transmit the telemetry data and/or other information to the cloud service 116 such that the custom machine learning models 118 are generated without sharing proprietary and/or custom information with the cloud service 116. In addition or alternatively to generating custom machine learning models 118, in some examples, the AI client service 102 is configured to reject determined notifications based on telemetry data and/or other information received from the UTC 114 that is unknown to the cloud service 116.

The AI client service 102 is communicatively coupled to the AI broker 104 for transmitting the determined notifications from the AI client service 102 to the AI broker 104. The AI broker 104 publishes the determined notifications received from the AI client service 102 to the relevant components 106, 108, 110, and/or 112 of the electronic device 100. For example, the AI broker 104 publishes notifications concerning the OS 106 to the OS 106 and any subscribed components 108, 110, and 112. The AI broker 104 publishes notifications concerning particular application software 108 to the particular application software 108 and any subscribed components 106, 108, 110, and/or 112. Similarly, the AI broker 104 publishes notifications concerning particular hardware 110 or 112 to the particular hardware 110 or 112 and any subscribed components 106, 108, 110, and/or 112. The components 106, 108, 110, and/or 112 of the electronic device 100 that have received published notifications then configure according to the published notifications, for example, according to logic of the OS 106 and/or the components 108, 110. Any determined notifications that have been rejected by the AI client service 102, as described above, will not be published by the AI broker 104.

FIG. 2 illustrates a flow chart of a method 200 for configuring an electronic device using artificial intelligence according to an embodiment. The example method 200 is performed by an electronic device such as electronic device 100, and includes receiving, at 202, at the electronic device, machine learning models matched to device metadata from a cloud service. At 204, the method 200 includes accessing telemetry data representing device usage data. The accessed telemetry data is input, at 206, into the received machine learning models to determine notifications to publish to components of the electronic device. At 208, the method includes publishing the determined notifications to the components. The notifications representing events predicted to occur on the electronic device. At 210, the method 200 includes configuring, by the components, the electronic device based on the published notifications.

FIG. 3 illustrates a flow chart of a method 300 for configuring one or more settings of an operating system of an electronic device using artificial intelligence according to an embodiment. The example method 300 is performed by an electronic device such as electronic device 100, and includes receiving, at 302, at the electronic device, machine learning models matched to device metadata from a cloud service. In the example method 300, the machine learning models are matched to device metadata that relates to an operating system of the electronic device. The method 300 optionally includes uploading, at 302*a*, the telemetry data to a cloud service and updating the machine learning models at the cloud service based on the telemetry data of the electronic device and/or telemetry data from another electronic device.

At 304, the method 300 includes accessing telemetry data representing device usage data. The telemetry data accessed at 304 may include data that represents how the electronic device has been used by the user over time (i.e., may represent a usage pattern over time). In addition or alternatively, in some examples, accessing at 304 the telemetry data includes accessing at 304*a* real-time telemetry data from the electronic device that represents how the electronic device is currently being used by the user.

In some examples, accessing at 304 the telemetry data includes accessing at 304*b* telemetry data and/or other information associated with the user and/or the electronic device that is unknown to the cloud service. The method 300 optionally includes, at 304*c*, augmenting at least one machine learning model using the telemetry data and/or other information that is unknown to the cloud service. For example, unknown to the cloud service, the electronic device may include additional hardware that uses battery power of the electronic device. The method 300 therefore may include augmenting, at 304*c*, a machine learning model such that a notification determined (e.g., at operation 312 described below) from the augmented machine learning model includes reducing power consumption of the electronic device.

The accessed telemetry data is input, at 306, into the received machine learning models. At 308, the method 300 includes determining whether an event is predicted to occur on the electronic device. The event predicted at 308 relates to the operating system of the electronic device, and may include, but is not limited to, the contradiction of a preference and/or action of the user with an expectation (e.g., determined from the telemetry data and/or the like) of the user, the contradiction of a preference and/or action of the user with a threshold defined and/or expected (e.g., determined from the telemetry data and/or the like) by the user, a bad deployment of application software and/or hardware, a fault of the electronic device 100 and/or a component thereof, and/or the like. For example, the user may attempt to manually configure the operating system of the electronic device with a preference (e.g., a personalization preference, a preference that a particular application automatically launches at boot up of the electronic device, and/or the like) that contradicts an expectation or threshold of the user (e.g., a maximum boot up time of the operating system or a particular application, a battery life of the electronic device, a processing load of the electronic device, and/or the like).

If it is determined at 308 that the event is not predicted to occur, the method 300 includes taking, at 310, no further action. If it is determined at 308 that the event is predicted to occur, the method 300 includes determining, at 312, one or more notifications concerning the one or more settings of the operating system that relate to the predicted event. In some examples, determining one or more notifications at 312 includes determining the notification(s) using a custom machine learning model that has been augmented at 304c.

Optionally, the method 300 includes, at 318, automatically rejecting at least one determined notification based on telemetry data and/or other information accessed at 304b that is unknown to the cloud service. For example, a notification determined at 312 may provide power settings for a work device (e.g., a higher performance setting, etc.) that reduce battery life of the electronic device, while the telemetry data and/or other information accessed at 304b identifies the electronic device as a personal device of the user. The method 300 therefore may include automatically rejecting at 318 the power settings of the notification determined at 312 based on the knowledge that the electronic device is a personal device and the power settings will drain the battery of the electronic device. In some examples, personal settings may trump enterprise settings when the electronic device is a personal device.

At 314, the method 300 includes publishing the determined notifications to the operating system and any subscribed components of the electronic device. The publication occurs using any notification architecture of the electronic device. Any notifications that have been automatically rejected at 318 will not be published at operation 314.

At 316, the method 300 includes configuring the setting(s) of the operating system (and any subscribed components) of the electronic device based on the published notifications.

In an example of the method 300, when the user selects a personalization preference on the electronic device, it is determined at 308 whether the selected preference will decrease the battery life of the electronic device below an expectation of the user. The user's expectation of the battery life of the electronic device may be learned from the telemetry data and may, in some examples, be built into the corresponding machine learning model(s) (e.g., the machine learning model(s) used at operation 306). If it is predicted at operation 308 that the preference will decrease the battery life of the electronic device below the expectation of the user, one or more notifications indicating that the preference change should be rejected are determined and published at operations 312 and 314, respectively. In some examples, the notifications may be a prompt to the user informing the user of the expected negative consequences, along with a request to confirm the selected preference.

In an example of the method 300, when the user selects that a particular application automatically launches at boot up of the electronic device, it is determined at 308 whether the selected application will increase the boot-up time of the electronic device beyond a threshold that has been previously set by the user (and may be built into the corresponding machine learning model(s) used at operation 306). If it is predicted at operation 308 that launching the particular application at boot-up of the electronic device will increase the boot-up time beyond the threshold, one or more notifications conveying this information, or denying the request to automatically launching the particular application at boot-up, are determined and published at operations 312 and 314, respectively.

In an example of the method 300, telemetry data from one or more other electronic devices indicating a bad deployment of a particular application is built into the machine learning model(s) used at operation 306. If it is predicted at operation 308 that deployment of the particular application will fail, one or more notifications conveying this information, or denying deployment of the particular application, are determined and published at operations 312 and 314, respectively.

In an example of the method 300, telemetry data from one or more other electronic devices indicating a remediation action of a fault of the electronic device is built into the machine learning model(s) used at operation 306. If it is predicted at operation 308 that the remediation action will facilitate remediating the fault of the electronic device, one or more notifications that deploy, or suggest deploying, the remediation action are determined and published at operations 312 and 314, respectively. Accordingly, the method 300 may enable automatic remediation of the electronic device.

FIG. 4 illustrates a flow chart of a method 400 for configuring an application and/or hardware of an electronic device using artificial intelligence according to an embodiment. The example method 400 includes receiving, at 402, at the electronic device, machine learning models matched to device metadata from a cloud service. In the example method 400, the machine learning models are matched to device metadata that relates to application software, internal hardware, and/or external hardware of the electronic device. The method 400 optionally includes uploading, at 402a, the telemetry data to a cloud service and updating the machine learning models at the cloud service based on the telemetry data of the electronic device and/or telemetry data from another electronic device.

At 404, the method 400 includes accessing telemetry data representing device usage data. The telemetry data accessed at 404 may include data that represents a usage pattern of the electronic device over time. In addition or alternatively, in some examples, accessing at 404 the telemetry data includes accessing at 404a real-time telemetry data from the electronic device that represents how the electronic device is currently being used by the user.

In some examples, accessing at 404 the telemetry data includes accessing at 404b telemetry data and/or other information associated with the user and/or the electronic device that is unknown to the cloud service. The method 400 optionally includes, at 404c, augmenting at least one machine learning model using the telemetry data and/or other information that is unknown to the cloud service.

The accessed telemetry data is input, at 406, into the received machine learning models. At 408, the method 400 includes determining whether an event is predicted to occur on the electronic device. The event predicted at 408 relates one or more applications and/or one or more pieces of hardware of the electronic device, and may include, but is not limited to, the upcoming use and/or activation of an application, an intended use of an application, the upcoming use and/or activation of internal hardware, an intended use of internal hardware, the upcoming use and/or activation of external hardware, an intended use of external hardware, the upcoming closing and/or de-activation of an application software, the upcoming powering-down of internal hardware, the upcoming powering-down and/or disconnection of external hardware, and/or the like.

For example, the method 400 may determine at 408 that a particular application and/or particular hardware is predicted to be used at an upcoming point in time based on the user's prior use of the particular application and/or hardware. Moreover, and for example, the method 400 may determine at 408 an intended use for particular hardware (e.g., a monitor will only be used to watch television) based on the user's prior use of the particular hardware and/or based on the prior use of the particular hardware on other electronic devices.

If it is determined at 408 that the event is not predicted to occur, the method 400 includes taking, at 410, no further action. If it is determined at 408 that the event is predicted to occur, the method 400 includes determining, at 412, one or more notifications concerning the application and/or the hardware that relate to the predicted event. Determining one or more notifications at 412 may include, in some examples, determining the notification(s) using a custom machine learning model that has been augmented at 404c. Optionally, the method 400 includes, at 418, automatically rejecting at least one determined notification based on telemetry data and/or other information accessed at 404b that is unknown to the cloud service.

At 414, the method 400 includes publishing the determined notifications to the application and/or hardware and any subscribed other components of the electronic device. The operation 414 does not include publishing any notifications that have been rejected at 418, such that such automatically rejected notifications will remain unpublished.

At 416, the method 400 includes configuring the application and/hardware (and any subscribed other components) of the electronic device based on the published notifications.

In an example of the method 400, the method 400 predicts, at operation 408, that the user will make a video call at an upcoming point in time. One or more notifications that prepare the electronic device for the video call are then determined at operation 412 and published at 414 to the video call application (e.g., Microsoft® Skype®) and any subscribing components (e.g., a video card, a sound card, a network card, an advertisement service application, and/or the like). For example, the notification(s) may instruct the skype application to open and configure for the video call. Moreover, the notification(s) may instruct the video call application and/or any subscribing components to download additional components to execute to facilitate the video call.

In an example of the method 400, the method 400 predicts, at operation 408, an intended use for an IoT device. One or more notifications that instruct the IoT device to be configured with one or more applications that relate to the predicted usage of the IoT device are then determined at operation 412 and published at operation 414 to the IoT device and any subscribing components, such that the IoT device and any subscribing components are configured, at operation 416 with the application(s) that relate to or are connected with the predicted usage. Optionally, the notification(s) instructs the IoT device and any subscribing components to be configured at operation 416 with a minimal application set required to operate the IoT device according to the predicted usage. In other words, the notification(s) instructs the IoT device and any subscribing components to be configured at operation 416 with only the application(s) necessary to operate the IoT device according to, to satisfy, to accommodate, or otherwise enable the predicted usage (e.g., the IoT device may be configured with a minimal set of binaries, in a binary driven data set). The predicted use of the IoT device may be learned from the telemetry data of the user and/or from telemetry data from one or more other electronic devices and may, in some examples, be built into the corresponding machine learning model(s) (e.g., the machine learning model(s) used at operation 406). The predicted use of the hardware may result in less expensive hardware (such as, but not limited to, IoT devices and/or the like) tailored for user-specific use.

ADDITIONAL EXAMPLES

In one example scenario, the methods, systems, and electronic devices described herein may be used to increase the functionality of virtual personal assistants (e.g., Microsoft® Cortana®, Amazon® Alexa®, Google® Home®, etc.) based on a user's usage of the virtual personal assistant. For example, new skills may be added to the virtual personal assistant based on the user's history of walking into a room, downloading music, setting lights, ordering food, and/or the like.

In another example scenario, the methods, systems, and electronic devices described herein may be used to tailor an electronic device to the uses of a family. For example, the configuration of the electronic device may be automatically changed based on usage patterns indicating that the user is an adult or a child.

Exemplary Operating Environment

Figure 5:
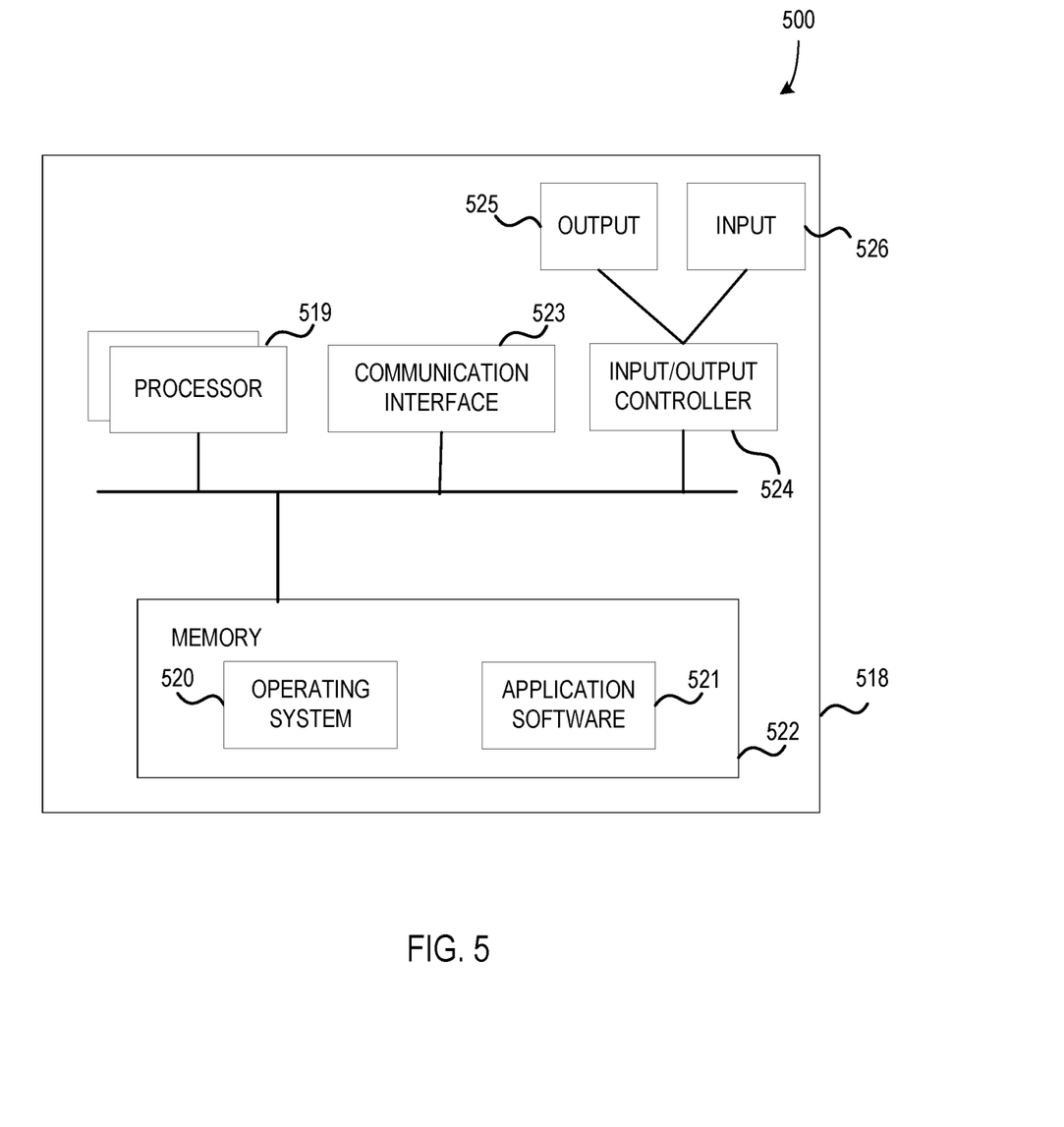
FIG. 5 illustrates an electronic device according to an embodiment as a functional block diagram.

The present disclosure is operable with an electronic device (i.e., a computing apparatus) according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, correlation of frames of video streams using a system clock may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user 527 may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for configuring an electronic device using AI. For example, the elements illustrated in FIG. 1, such as when encoded to perform the operations illustrated in FIGS. 2-4, constitute exemplary means for configuring an electronic device using AI.

Alternatively or in addition to the other examples described herein, examples include any combination of the following:

An electronic device comprising:
at least one processor;
at least one memory storing telemetry data gathered from the electronic device, the telemetry data representing at least device usage data, the memory further storing one or more machine learning models matched to device metadata;
an artificial intelligence (AI) client service that, in response to execution by the processor, receives the one or more machine learning models from a cloud service and inputs the telemetry data from the memory into the one or more machine learning models to determine notifications to publish to components of the electronic device;
an AI client broker that, in response to execution by the processor, publishes the determined notifications to the components, the notifications representing events predicted to occur on the electronic device; and
configuring, by the components, the electronic device based at least on the published notifications.
wherein the components include an operating system of the electronic device and the AI client service, in response to execution by the processor, determines notifications relating to at least one setting of the operating system, and wherein configuring, by the components, includes configuring the at least one setting of the operating system based at least on the published notifications.

wherein the components include at least one of an application of the electronic device or hardware of the device, and the AI client service, in response to execution by the processor, determines notifications relating to the at least one of the application or the hardware and wherein configuring, by the components, includes configuring the at least one of the application or the hardware based at least on the published notifications.

wherein the AI client service, in response to execution by the processor, augments at least one of the machine learning models using information that is unknown to the cloud service.

wherein the components include hardware of the electronic device and the AI client service, in response to execution by the processor, determines notifications relating to the hardware, the notifications representing a predicted usage of the hardware based on the telemetry data, and wherein configuring, by the components, includes configuring the hardware with at least one application concerning the predicted usage of the hardware.

wherein the components include hardware of the electronic device and the AI client service, in response to execution by the processor, determines notifications relating to the hardware, the notifications representing a predicted usage of the hardware based on the telemetry data, and wherein configuring, by the components, includes configuring the hardware with a minimal application set required to operate the hardware according to the predicted usage.

further comprising a universal telemetry client that, in response to execution by the processor, uploads the telemetry data from the memory to the cloud service for updating the machine learning models at the cloud service based on at least one of the telemetry data of the electronic device or telemetry data from another electronic device.

wherein the telemetry data input by the AI client service from the memory into the machine learning models is real-time telemetry data from the electronic device.

wherein the AI client service, in response to execution by the processor, rejects at least one of the determined notifications based on information that is unknown to the cloud service.

A computerized method comprising:
receiving, at an electronic device, machine learning models matched to device metadata from a cloud service;
accessing telemetry data representing at least device usage data;
inputting the accessed telemetry data into the received machine learning models to determine notifications to publish to components of the electronic device;
publishing the determined notifications to the components, the notifications representing events predicted to occur on the electronic device; and
configuring, by the components, the electronic device based at least on the published notifications.

wherein inputting the accessed telemetry data into the received machine learning models includes determining notifications relating to at least one setting of an operating system of the electronic device, and wherein configuring, by the components, includes configuring the at least one setting of the operating system based at least on the published notifications.

wherein inputting the accessed telemetry data into the received machine learning models includes determining notifications relating to at least one of an application of the electronic device or hardware of the device, and wherein configuring, by the components, includes configuring the at least one of the application or the hardware based at least on the published notifications.

further comprising augmenting at least one of the machine learning models using information that is unknown to the cloud service.

wherein inputting the accessed telemetry data into the received machine learning models includes determining notifications relating to hardware of the electronic device, the notifications representing a predicted usage of the hardware based on the telemetry data, and wherein configuring, by the components, includes configuring the hardware with at least one application relating to the predicted usage of the hardware.

wherein inputting the accessed telemetry data into the received machine learning models includes determining notifications relating to hardware of the electronic device, the notifications representing a predicted usage of the hardware based on the telemetry data, and wherein configuring, by the components, includes configuring the hardware with a minimal application set required to operate the hardware according to the predicted usage.

further comprising uploading the telemetry data from the memory to the cloud service, and updating the machine learning models at the cloud service based on at least one of the telemetry data of the electronic device or telemetry data from another electronic device.

wherein accessing telemetry data representing device usage data comprises accessing real-time telemetry data from the electronic device.

One or more computer storage media having computer-executable instructions for leveraging artificial intelligence to configure a device that, in response to execution by a processor, cause the processor to at least:
receive machine learning models matched to device metadata from a cloud service;
access telemetry data representing at least device usage data;
input the accessed telemetry data into the received machine learning models to determine notifications to publish to components of the electronic device;
publish the determined notifications to the components, the notifications representing events predicted to occur on the electronic device; and configure, by the components, the electronic device based on the published notifications.

wherein the processor inputs the accessed telemetry data into the received machine learning models to determine notifications relating to at least one of at least one setting of an operating system of the electronic device, an application of the device, or hardware of the device, and wherein configuring, by the components, includes configuring the at least one of the at least one setting of the operating system, the application, or the hardware based at least on the published notifications.

wherein the processor augments at least one of the machine learning models using information that is unknown to the cloud service.

wherein the processor inputs the accessed telemetry data into the received machine learning models to determine notifications relating to at least one of an application of the electronic device or hardware of the electronic device, and wherein configuring, by the components, includes configuring the at least one of the application or the hardware based at least on the published notifications.

wherein the processor inputs the accessed telemetry data into the received machine learning models to determine notifications relating to hardware of the electronic device, the notifications representing a predicted usage of the hardware based at least on the telemetry data, and wherein configuring, by the components, includes configuring the hardware with at least one application relating to the predicted usage of the hardware.

wherein the processor inputs the accessed telemetry data into the received machine learning models to determine notifications relating to hardware of the electronic device, the notifications representing a predicted usage of the hardware based at least on the telemetry data, and wherein configuring, by the components, includes configuring the hardware with a minimal application set required to operate the hardware according to the predicted usage.

wherein the processor is further caused to upload the telemetry data to the cloud service for updating the machine learning models at the cloud service based on at least one of the telemetry data of the electronic device or telemetry data from another electronic device.

wherein the processor accesses real-time telemetry data from the electronic device.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An electronic device comprising:
    at least one processor;
    at least one memory storing telemetry data gathered from the electronic device, the telemetry data at least representing device usage data, the memory further storing device metadata;
    a client service having computer-executable instructions that, in response to execution by the at least one processor, cause the at least one processor to:
        send, to a cloud service, a request for at least one machine learning model based on the device metadata of the electronic device,
        receive, from the cloud service, the at least one machine learning model created for the electronic device based on the device metadata,
        update the received at least one machine learning model at the electronic device with information that is associated with at least one of the electronic device or a user of the electronic device,
        input the telemetry data from the memory into the updated at least one machine learning model, and
        determine, based on the telemetry data input into the updated at least one machine learning model, a notification to publish to a component of the electronic device that is customized to at least one of the user or the electronic device; and
    a client broker having computer-executable instructions that, in response to execution by the at least one processor, cause the at least one processor to publish the determined notification to the component, the notification representing an event predicted to occur on the electronic device,
    wherein the component has computer-executable instructions that, in response to execution by the at least one processor, cause the at least one processor to configure the electronic device based at least on the published notification.

2. The electronic device of claim 1, wherein the component includes an operating system of the electronic device and the client service has computer-executable instructions that, in response to execution by the processor, determine a notification relating to at least one setting of the operating system, and wherein configuring, by the component, includes configuring the at least one setting of the operating system based at least on the published notification.

3. The electronic device of claim 1, wherein the component includes at least one of an application of the electronic device or hardware of the electronic device, and the client service has computer-executable instructions that, in response to execution by the processor, determine a notification relating to the at least one of the application or the hardware, and wherein configuring, by the component, includes configuring at least one of the application or the hardware based at least on the published notification.

4. The electronic device of claim 1, wherein the information that is associated with at least one of the electronic device or the user of the electronic device and used to update the received at least one machine learning model is unknown to the cloud service.

5. The electronic device of claim 1, wherein the component includes hardware of the electronic device and the client service has computer-executable instructions that, in response to execution by the processor, determine a notification relating to the hardware, the notification representing a predicted usage of the hardware based at least on the telemetry data, and wherein configuring, by the component, includes configuring the hardware with at least one application relating to the predicted usage of the hardware.

6. The electronic device of claim 1, further comprising a universal telemetry client that has computer-executable instructions that, in response to execution by the processor, upload the telemetry data from the memory to the cloud service for updating the at least one machine learning model at the cloud service based on at least one of the telemetry data of the electronic device or telemetry data from another electronic device.

7. The electronic device of claim 1, wherein the telemetry data input by the client service from the memory into the at least one machine learning model includes real-time telemetry data from the electronic device.

8. The electronic device of claim 1, wherein the client service has computer-executable instructions that, in response to execution by the processor, reject the determined notification based on information that is associated with at least one of the user or the electronic device.

9. The electronic device of claim 1, wherein the information that is associated with at least one of the electronic device or the user of the electronic device and used to update the at least one machine learning model comprises at least one of custom hardware of the electronic device, a proprietary chip, hardware of the electronic device, software of the electronic device, whether the electronic device is a work device, or whether the electronic device is a personal device.

10. The electronic device of claim 1, wherein the client service has computer-executable instructions that, in response to execution by the at least one processor, request the at least one machine learning model from the cloud service based on the device metadata, the at least one machine learning model being an open neural network exchange (ONNX) model.

11. A method implemented on an electronic device, the method comprising:
sending, to a cloud service, a request for at least one machine learning model based on device metadata of the electronic device;
receiving, from the cloud service, the at least one machine learning model matched to the device metadata;
updating the received at least one machine learning model at the electronic device with information that is associated with at least one of the electronic device or a user of the electronic device;
accessing telemetry data representing at least device usage data;
inputting the accessed telemetry data into the updated at least one machine learning model to determine a notification that is customized to at least one of the user or the electronic device to publish to a component of the electronic device;
publishing the determined notification to the component, the notification representing an event predicted to occur on the electronic device; and
wherein the component is configured to configure the electronic device based at least on the published notification.

12. The method of claim 11, wherein inputting the accessed telemetry data into the updated at least one machine learning model includes determining a notification relating to at least one setting of an operating system of the electronic device, and wherein configuring, by the component, includes configuring the at least one setting of the operating system based at least on the published notification.

13. The device implemented method of claim 11, wherein inputting the accessed telemetry data into the updated at least one machine learning model includes determining a notification relating to at least one of an application of the electronic device or hardware of the electronic device, and wherein configuring, by the component, includes configuring the at least one of the application or the hardware based at least on the published notification.

14. The method of claim 11, wherein the information that is associated with at least one of the electronic device or the user of the electronic device and used to update the received at least one machine learning model is unknown to the cloud service.

15. The method of claim 11, wherein inputting the accessed telemetry data into the updated at least one machine learning model includes determining a notification relating to hardware of the electronic device, the notification representing a predicted usage of the hardware based at least on the telemetry data, and wherein configuring, by the component, includes configuring the hardware with at least one application relating to the predicted usage of the hardware.

16. One or more computer storage media having computer-executable instructions to configure an electronic device that, in response to execution by a processor of the electronic device, cause the processor to at least:
send, to a cloud service, a request for at least one machine learning model based on device metadata of the electronic device,
receive, from the cloud service, the at least one machine learning model matched to the device metadata;
update the received at least one machine learning model at the electronic device with information that is associated with at least one of the electronic device or a user of the electronic device;
access telemetry data representing at least device usage data;
input the accessed telemetry data into the updated at least one machine learning model to determine a notification that is customized to at least one of the user or the electronic device to publish to a component of the electronic device; and
publish the determined notification to the component, the notification representing an event predicted to occur on the electronic device,
wherein the component is configured to configure the electronic device based at least on the published notification.

17. The one or more computer storage media of claim 16, wherein the processor is configured to input the accessed telemetry data into the updated at least one machine learning model to determine a notification relating to at least one of (i) at least one setting of an operating system of the electronic device, (ii) an application of the electronic device, or (iii) hardware of the electronic device, and wherein configuring, by the component, includes configuring the at least one of (i) the at least one setting of the operating system, (ii) the application, or (iii) the hardware based on the published notification.

18. The one or more computer storage media of claim 16, wherein the at least one machine learning model matched to the device metadata relates to an operating system of the electronic device.

19. The one or more computer storage media of claim 16, wherein the processor is configured to input the accessed telemetry data into the updated at least one machine learning model to determine a notification relating to hardware of the electronic device, the notification representing a predicted usage of the hardware based on the telemetry data, and wherein configuring, by the component, includes configuring the hardware with at least one application relating to the predicted usage of the hardware.

20. The one or more computer storage media of claim 16, wherein the processor is further configured to upload the telemetry data to the cloud service for updating the at least one machine learning model at the cloud service based on at least one of the telemetry data of the electronic device or telemetry data from another electronic device.

* * * * *